June 13, 1961

G. K. NEWELL 2,988,388

ARTICULATED BRAKE CYLINDER PUSH ROD

Filed Dec. 23, 1959

INVENTOR.
George K. Newell
BY
Adelbert A. Steinmiller
Attorney

_United States Patent Office_ 2,988,388
Patented June 13, 1961

2,988,388
ARTICULATED BRAKE CYLINDER PUSH ROD
George K. Newell, Level Green, Pa., assignor to Westinghouse Air Brake Company, Wilmerding, Pa., a corporation of Pennsylvania
Filed Dec. 23, 1959, Ser. No. 861,564
1 Claim. (Cl. 287—85)

This invention relates to push rods for brake cylinders used on railway freight cars and more particularly to push rods for brake cylinders used in brake apparatus in which one or more brake cylinders are secured to one brake beam and the push rod of each of the brake cylinders is pivotally connected to another brake beam.

The trucks of railway freight cars are constructed with a considerable amount of inherent flexibility which is provided by the various members that make up the truck.

A bolster for a truck of a freight car has a plurality of lugs by which the bolster is retained and guided with respect to the side frames of the truck, there being normally a certain amount of clearance between the lugs and the side frames. This clearance between the lugs on the bolster and the side frames acts to limit, but does not rigidly restrain, relative angular motion between the bolster and the side frames of the truck.

Likewise, there is a certain amount of clearance between the journal boxes on the ends of the side frames and the axle journals which also limits but does not rigidly prevent relative lateral motion between the axles upon which the wheels are mounted and the side frames of the truck.

Accordingly, this clearance between the various members that make up the truck of a freight car provides for an appreciable amount of "weaving" or departure from the normal rectangular configuration of the truck, this "weaving" having been found by many years of experience to be essential in maintaining the stability of the truck and its ability to stay or remain on the rails when traveling at high speeds, and to facilitate the negotiation of curves, crossovers, and switches in railway tracks.

Furthermore, it has been found from experience that the prevention of excessive wear of the flange and tread of the truck wheels depends, in a large measure, upon the provision of a certain amount of flexibility in the truck.

It is, therefore, important that, when a brake apparatus is applied to or installed upon the trucks of a railway freight car, this inherent and necessary flexibility of the trucks be interfered with or curtailed to the least possible extent.

Recently, various types of simplified railway vehicle brake rigging, and more particularly brake apparatus and brake rigging for the trucks of railway cars have been devised and placed in service. For example, in the copending application Serial No. 682,181, filed September 5, 1957, now Patent No. 2,958,398 issued November 1, 1960 to George K. Newell and assigned to the assignee of the present application, there is shown and described a simple and lightweight brake apparatus, especially for the trucks of railway freight cars, comprising one or more brake cylinders secured to one brake beam. Each of these brake cylinders has slidably mounted therein a piston having secured to one face thereof one end of a hollow rod, which hollow rod has its opposite end connected by a push rod holder pin to a push rod intermediate the ends thereof. The portion of the push rods at one side of the push rod holder pins is disposed within the hollow rods and the end of the other portion of the push rods is pivotally connected by suitable means, such as a pin, to another brake beam.

The connection provided by the push rod holder pin between the hollow rod and the push rod is such that only a very limited amount of movement can occur between these two members. Furthermore, the pivotal connection provided by the pin that pivotally connects the push rod to the abovementioned another brake beam allows movement of the push rod about this pin substantially in only a horizontal plane.

It has been found that, when a rigid push rod is used in the brake apparatus disclosed in the above-mentioned Patent No. 2,958,398 and is connected to a hollow rod and a brake beam in the manner described above, this rigid type of push rod interferes undesirably with the flexibility of the truck upon which this brake apparatus is installed.

Accordingly, it is the general purpose of this invention to provide a novel, simple, and inexpensive means to enable the application of the above mentioned brake apparatus to a truck of a railway freight car without interfering with the flexibility of the truck. More particularly, the object of the invention is to provide a novel push rod which is articulated by having one or more universal joints located intermediate its ends. Therefore, by using such an articulated push rod in the brake apparatus mentioned above, this brake apparatus may be used on a truck without curtailing the flexibility of the truck.

Consequently, the principal feature of the invention is the provision of a brake cylinder push rod having one or more universal joints of novel construction, which push rod is simple, serviceable, reliable and inexpensive to manufacture.

Essentially, the push rod of the present invention comprises three sections. Each end of an intermediate section is pivotally connected by a novel ball and socket type of universal joint to one of the other two sections to provide for flexing or movement of one section relative to another section. Each universal joint comprises a spherical ball-like surface formed on one end of the outer sections of the push rod and a spherical socket formed on one end of the intermediate section into which is received the spherical ball-like surface formed on the one end of the adjacent outer section. Each ball and socket joint is encased in a resilient flexible sleeve of material, such as rubber reinforced with fabric. A clamp concentrically surrounds each end of the sleeve to tightly secure the respective end of the sleeve to the corresponding section of the push rod over which it is slidably fitted.

The connections provided by the ball and socket type universal joints between each end of the intermediate section of the push rod and the adjacent end of one of the outer sections is therefore made in such a manner that the forces acting on the brake beams resulting from "weaving" or normal distortion of the members that make up the trucks of a railway freight car can only cause flexure of the push rods at the articulated joints in these rods. Hence, these forces cannot build up counter forces in the push rod which would act to restrain such "weaving" or distortion.

Description

Figure 1:
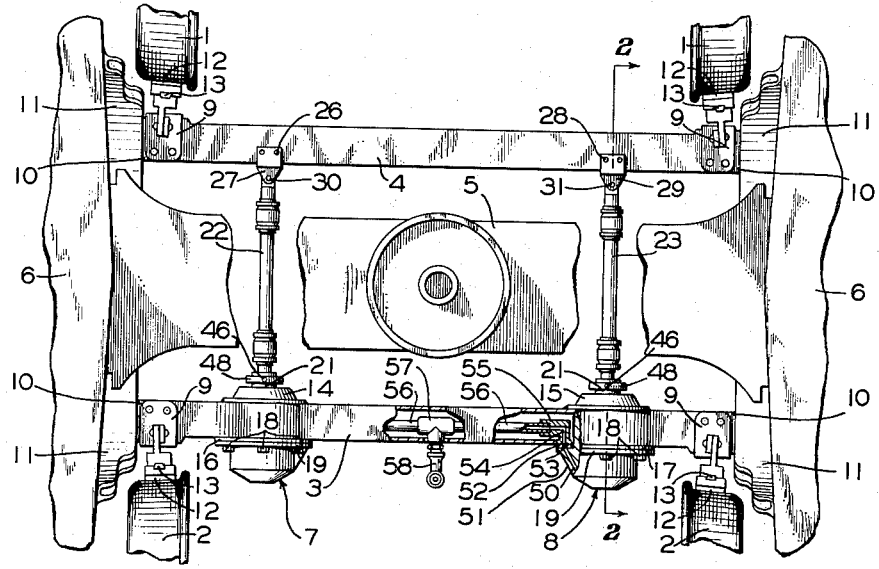
FIG. 1 is a plan view, partially in section, of a brake apparatus for a four-wheel (that is, two axle) car truck, which brake apparatus includes a pair of brake cylinders mounted on a single brake beam and operatively connected, by articulated type push rods constructed according to this invention, to a second brake beam.

Referring to FIG. 1 of the drawing, the reference numerals 1 and 2 designate respectively the wheels secured at opposite ends of each of two axles of a two-axle four-wheel truck of a railway freight car.

The brake apparatus shown in FIG. 1 comprises a pair of brake beams 3 and 4 extending crosswise of the truck and in parallel spaced relation to each other and to a bolster 5 of the truck. The brake beams 3 and 4 are symmetrically arranged on opposite sides of the bolster 5 and are movably supported at each end on side frame members 6 of the truck in the manner fully described in detail in the hereinbefore mentioned Patent No. 2,958,398.

The brake beams 3 and 4 may have the shape of a standard channel, illustrated (FIG. 2) as a box-like channel. Brake beam 3 is further constructed, as fully described in detail in the hereinbefore mentioned Patent No. 2,958,398 to provide a support for a pair of fluid motors or brake cylinders 7 and 8.

A brake head 9 is riveted or otherwise attached to each end of the brake beams 3 and 4 adjacent to and on the inboard side of a guide foot 10. Each foot 10 has two legs, one of which extends inward from one end into the hollow box-like brake beam and is suitably secured thereto. The other leg is slidably supported in a grooved wear plate and guide member 11 which is secured to a side frame member 6 of the truck.

Each brake head 9 carries a composition brake shoe 12 for contact with the tread of an associated wheel. In customary manner the brake shoe has a backing plate provided with a key bridge to receive a key 13 for removably locking the shoe 12 to the brake head 9.

The brake shoes 12 are operated into and out of contact with their associated wheels 1, 2 by means of the fluid motors or brake cylinders 7 and 8 secured to the brake beam 3 in the manner fully described in the hereinbefore mentioned Patent No. 2,958,398.

Briefly, a pair of brake cylinder non-pressure heads 14 and 15, one head for each of the brake cylinders 7 and 8, is secured, as by welding, in spaced relation along and to one side of the extruded flanges of the box-shaped channel comprising the brake beam 3. Similarly, two rings 16 and 17 are secured in corresponding spaced relation to the opposite side of the extruded flanges. The inside diameter of the rings 16 and 17 is substantially the same as the outside diameter of the body of the brake cylinders 7 and 8 to permit the open end of these cylinder bodies to be inserted therethrough and these cylinder bodies to be secured to the rings 16 and 17 as by a plurality of cap screws 18, said cap screws extending through a plurality of circumferentially spaced holes in an external radial flange 19 formed integral with each cylinder body and similarly arranged holes registering therewith in the rings 16 and 17.

Figure 2:
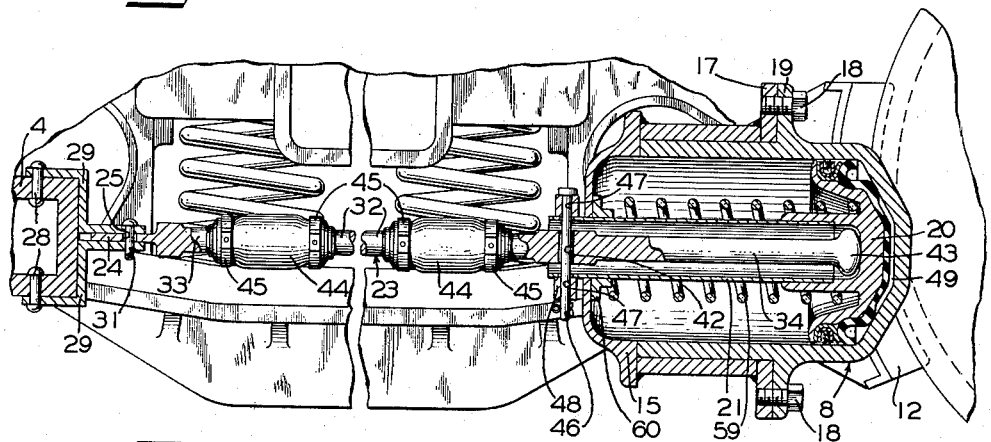
FIG. 2 is a cross-sectional view, taken along the line 2—2 of FIG. 1, looking in the direction of the arrows and showing details of one brake cylinder and the manner of mounting it on one brake beam and operatively connecting the articulated push rod thereof to another brake beam.
Figure 3:
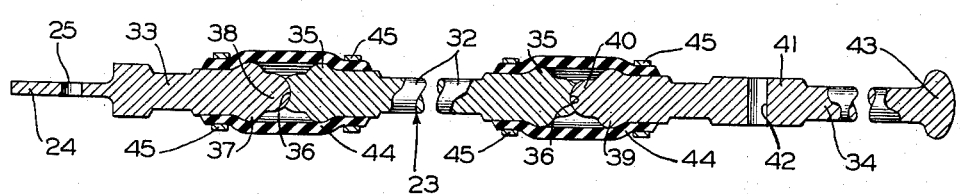
FIG. 3 is an enlarged cross-sectional view, of one of the articulated push rods shown in FIGS. 1 and 2, showing details of the novel ball and socket type universal joints located intermediate the ends of the push rod.

The body of each of the brake cylinders 7 and 8 has a bore in which, as is shown in FIG. 2, a piston 20 is slidably operable. A hollow rod or tube 21 secured coaxially to each of the pistons 20 extends through a central opening in the respective non-pressure heads 14 and 15. Each hollow rod 21 is adapted to receive one end of one of a pair of identical articulated push rods 22 and 23. The opposite end of the respective push rods 22 and 23 has a tongue 24 provided with a punched hole 25 as shown in FIGS. 2 and 3.

In order to pivotally connect the tongue end of the articulated push rods to the brake beam 4, two rivets 26 secure each one of a first pair of identical but oppositely arranged offset jaws 27 to the brake beam 4. Likewise, two rivets 28 secure each one of a second pair of identical but oppositely arranged offset jaws 29 to the brake beam 4 in spaced-apart relation to the first pair of jaws. Each of the four jaws has a hole punched therein substantially of the same diameter as the hole 25 in the tongue 24 on one end of each of the articulated push rods. These punched holes are in such a location that the first pair of jaws 27 cooperate to form a clevis to which the tongue end of the articulated push rod 22 may be pivotally connected by suitable means, such as a pin 30, and the second pair of jaws 29 cooperate to form a clevis to which the tongue end of the articulated push rod 23 may be pivotally connected by suitable means, such as a pin 31.

As hereinbefore mentioned, the articulated push rods 22 and 23 are identical. Therefore, only the push rod 23 which is shown in FIG. 3 will be described in detail.

The push rod 23 consists illustratively of three rod-like sections, an intermediate section 32 and two end sections 33 and 34. The three sections may be formed in any manner, such as by forging. For example, the diameter of opposite end portions of section 32 may be increased by the forging process known as upsetting. Also, each end portion of the section 32 may have formed thereon, by a forging process, an annular collar or rib 35 and a spherical socket surface 36.

In similar manner the section 33 may be formed so as to have adjacent the intermediate section 32 an annular collar or rib 37 and a spherical ball-like surface 38 having substantially the same diameter as the socket surfaces 36 on the intermediate section 32. The opposite end of the section 33 is in the form of a flat tongue 24 having a hole 25.

Likewise, the end section 34 may have formed at one end thereof an annular collar or rib 39 and a spherical ball-like surface 40 each substantially the same in size as the corresponding annular rib 37 and ball-like surface 38 formed on the other end section 33.

Formed intermediate the ends of section 34 is a flat portion 41 having a hole 42.

The opposite end of the end section 34 has formed thereon a ball-like knob 43.

The ball-like surface of each of the end sections 33 and 34 is secured respectively to a corresponding end of the intermediate section 32 by means which will now be described. First, one end of one of a pair of identical sleeves 44 of rubber reinforced with fabric is pushed over the annular rib 35 on one end of the intermediate section 32 after which one end of the other sleeve 44 is pushed over the annular rib 35 on the other end of the intermediate section 32. Next, the end of the end section 33 upon which is formed the annular rib 37 is pushed into the open end of the sleeve 44 until the spherical ball-like surface 38 is disposed in the socket surface 36 formed on the adjacent end of the intermediate section 32. Thereafter, the end of the end section 34 upon which is formed the annular rib 39 is pushed into the open end of the other sleeve 44 until the spherical ball-like surface 40 is disposed in the socket surface 36 formed on that end of the intermediate section 32 that previously was pushed into this sleeve. Thereafter, one of four identical clamps 45 is slipped over each end of each sleeve 44.

The assembled push rod 23 is now placed in a hose clamp applying machine, which may be such as that fully described and claimed in United States Reissue Patent 24,636, issued April 21, 1959 to Ellis E. Hewitt et al. and assigned to the assignee of the present application. Each of the clamps 45 is then tightened about its respective sleeve 44 and subsequently locked in its tightened condition by operation of the hose clamp applying machine, as fully described in the aforesaid reissue patent.

After assembling each of the articulated push rods 22 and 23 in the manner just explained for the push rod 23, the end sections 34 of the respective push rods 22 and 23 are inserted respectively into the respective open ends of the hollow rods 21 that are secured to the pistons 20 slidably mounted in the brake cylinders 7 and 8. The push rods 22 and 23 are thereafter pushed into the respective hollow rods 21 until the knob 43 on each push rod abuts the respective piston 20. When the knobs 43 have been pushed into abutting contact with the respective pistons 20, the holes 42 in the end sections 34 of the push rods will be in such a position that each of the push rods may be connected to one of the respective hollow rods 21 by one of a pair of identical push rod holder pins 46 which may be inserted through two diametrically opposite holes 47 in each one of a pair of annular push rod holders 48 and the respective hole 42 which is now coaxially aligned with the holes 47 in one of the push rod holders. The annular push rod holders 48 respectively concentrically surround that end of the respective hollow rods 21 that project through a bore in the respective nonpressure heads 14 and 15 and each is secured thereto, as by a pair of dog point set screws (not shown).

Following the connection of each of the articulated push rods 22 and 23 to one of the respective hollow rods 21 by a push rod holder pin 46, the tongue 24 on the end section 33 of the push rod 22 is positioned in the clevis formed by the pair of jaws 27 secured to the opposite sides of the brake beam 4 so that the hole 25 is aligned with the coaxial holes in the respective jaws 27. The pin 30 is now inserted through the aligned holes in the jaws 27 and tongue 24 to pivotally connect the articulated push rod 22 to the brake beam 4.

After the articulated push rod 22 has been pivotally connected to the brake beam 4 by the pin 30, as just explained, the articulated push rod 23 is likewise pivotally connected to the brake beam 4 by the pin 31 by following the same procedure.

Formed on a packing cup secured to each of the pistons 20 are a plurality of lugs. When each piston 20 occupies the position in which the piston 20 for the cylinder 8 is shown in FIG. 2, these lugs contact the end wall or pressure head of the respective brake cylinders 7 and 8 to form between the respective piston and pressure head a pressure chamber 49 to which fluid under pressure may be supplied through a passageway 50 (FIG. 1) formed in a rib 51 extending outward from the periphery of the body of each brake cylinder and formed integral therewith. The passageway 50 in each rib 51 opens at a contact face 52 of the radial flange 19 of the respective brake cylinder body and registers with a corresponding port 53 in that one of the rings 16 and 17 through which the respective brake cylinder body extends. The ports 53 in the respective rings 16 and 17 in turn register respectively with a passageway 54 formed in each of a pair of elbow fittings 55 secured respectively to the inside surface of the rings 16 and 17. A pipe or conduit 56 having at each end screw-threaded or other means of attachment with one of the elbow fittings 55, connects these elbow fittings, through a pipe T 57 disposed in the pipe or conduit substantially midway the ends thereof, to one end of a flexible hose 58. The opposite end of the flexible hose 58 may be connected to the brake cylinder pipe leading from the usual brake controlling valve device of the air brake system on railway freight cars. Fluid under pressure supplied to the pressure chambers 49 in the respective brake cylinders 7 and 8 through the flexible hose 58, the pipe T 57, the pipe 56, passageways 54, ports 53 and passageways 50 causes movement of the brake cylinders 7 and 8, and brake beam 3 in one direction and the pistons 20, articulated push rods 22 and 23 and brake beam 4 in the opposite direction to effect braking contact of the brake shoes 12 carried by the brake beams 3 and 4 with the tread of their respectively associated wheels.

Therefore, in operation, when it is desired to effect a brake application, fluid under pressure is admitted simultaneously to the pressure chamber 49 in each of the brake cylinders 7 and 8 through the flexible hose 58 which is connected to the brake controlling valve device of the usual air brake system on railway freight cars, pipe T 57, pipe 56, passageways 54, ports 53 and passageways 50. Fluid under pressure thus supplied to the chambers 49 formed between the pistons 20 and the respective closed end or pressure head of the brake cylinders 7 and 8 is effective to move the pistons 20 and the brake cylinders 7 and 8 in opposite directions. As the pistons 20 and brake cylinders 7 and 8 are moved in opposite directions, the brake beams 3 and 4 also move in opposite directions since the pistons 20 are connected to the brake beam 4 through the articulated push rods 22 and 23 and the brake cylinders 7 and 8 are carried by the brake beam 3. As the brake beams move in opposite directions, the brake shoes 12 carried by the beams are brought into braking contact with the wheels of the truck to effect a braking action on the wheels.

As the brake beams 3 and 4 are moved as described above, these beams are supported and guided by the guide feet 10 as these feet have sliding contact in the grooves in the wear plate and guide members 11. As hereinbefore mentioned, the orientation of the wear plate and guide members 11 is such that the brake beams 3 and 4 and the brake shoes 12 carried thereby are moved radially toward the wheels.

It will be understood that in view of the symmetrical disposition of the brake cylinders on one brake beam on opposite sides of the longitudinal axis of the truck and the corresponding symmetrical relation of the points at which the articulated piston rods are pivotally connected to the other brake beam, the simultaneous supply of fluid at the same pressure to the pressure chambers 49 of both brake cylinders produces substantially equalized forces of application of the brake shoes to the wheels.

It should be noted at this point that, if "weaving" or distortion of the members that make up the truck occurs, while the brake beams 3 and 4 are moving in opposite directions to bring the brake shoes 12 into braking contact with the respective wheels of the truck, or after the brake shoes have been brought into braking contact with the respective wheels, to move either of the brake beams 3 or 4 out of the hereinbefore mentioned parallel spaced relation to the other to a position in which the brake beams are each at an angle with respect to the other, the three-section articulated push rods 22 and 23 allow, by reason of the socket surfaces 36 formed on the ends of the intermediate section 32 and spherical ball-like surfaces 38 and 40 formed respectively, on the end sections 33 and 34, either brake beam to be thus moved with respect to the other brake beam without inducing any bending stresses in any of the three sections that make up each push rod. It is apparent that the two sleeves 44 used in the construction of each articulated push rod are the only members of the push rods that are subject to any bending stresses as either brake beam is moved to a position at an angle to the other brake beam as a result of "weaving" or distortion of the members that make up the structure of the truck. By reason of the fact that each sleeve 44 is made of a resilient or elastic material, such as rubber, and is reinforced with fabric, these members of the push rod structure may be flexed or subject to bending stresses, by "weaving" of the truck without in any way damaging or permanently distorting the push rods.

When it is desired to release the brake application, the fluid under pressure supplied to the chambers 49 of the brake cylinders 7 and 8 is vented in the usual manner to atmosphere through the passageways 54, pipe 56, pipe T 57, and the flexible hose 59 to the brake controlling valve device of the car brake system, whereupon a release spring 59 which is interposed between each piston 20 and a spring seat 60 which rests against the corresponding non-pressure head moves the corresponding brake cylinder and its piston in a brake release direction to move the brake beams toward each other and the brake shoes correspondingly away from the tread surface of the wheels of the truck to effect a brake release.

Having now described the invention, what I claim as new and desire to secure by Letters Patent is:

Universal joint means for providing a connection between two rigid rod sections disposed in substantially coaxial aligned relation, said means comprising a spherical recess on one end of one of the rigid rod sections, an annular rib formed on said one rigid rod section adjacent said spherical recess, a spherical ball-like surface on the adjacent end of the other of said rigid rod sections, said ball-like surface conforming to and engaged in said spherical recess, an annular rib formed on said other rigid rod section adjacent said spherical ball-like surface, a resilient flexible sleeve means coaxially disposed over the adjacent ends of said rod sections surrounding said ribs and extending beyond each rib on the side away from the engaged ends of the rod sections, and clamping means disposed about each of the opposite ends of said resilient flexible sleeve means for clamping the respective ends of the sleeve means to the corresponding one of said rigid rod sections.

References Cited in the file of this patent

UNITED STATES PATENTS

| | | |
|---|---|---|
| 743,346 | Swain | Nov. 3, 1903 |
| 1,772,915 | Roseberg | Aug. 12, 1930 |
| 2,171,999 | Weiland | Sept. 5, 1939 |
| 2,491,653 | Fitch | Dec. 20, 1949 |
| 2,608,840 | Lahaie | Sept. 2, 1952 |
| 2,665,841 | Smith | Jan. 12, 1954 |
| 2,752,122 | Hayatt et al. | June 26, 1956 |